United States Patent Office 3,507,372
Patented Apr. 21, 1970

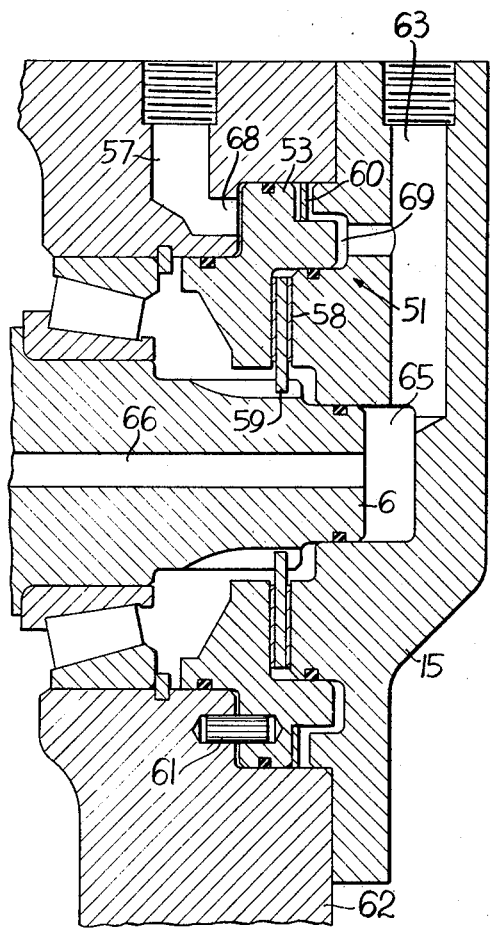
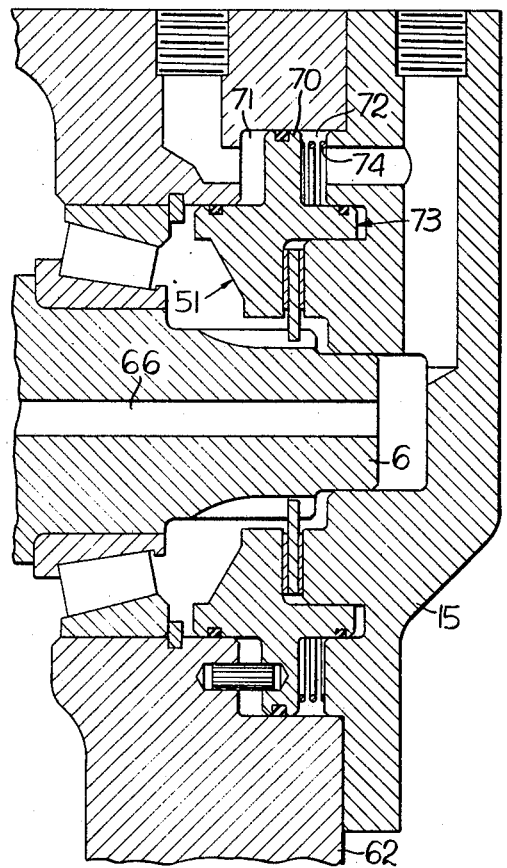
Fig. 2
Fig. 3

3,507,372
HYDRAULIC CLUTCH AND BRAKE SYSTEM
Gary O. Gilbertson, Milwaukee, and Donald W. Longshore and Robert E. Schott, New Berlin, Wis., assignors to Allis-Chalmers Manufacturing Company, Milwaukee, Wis.
Filed June 3, 1968, Ser. No. 734,051
Int. Cl. F16d 67/04
U.S. Cl. 192—18                                8 Claims

ABSTRACT OF THE DISCLOSURE

A hydraulically actuated clutch and brake for controlling the power delivery from a power take-off shaft by coordinating the engagement and release of the brake and clutch and providing control for the power take-off implement.

---

Figure 1:
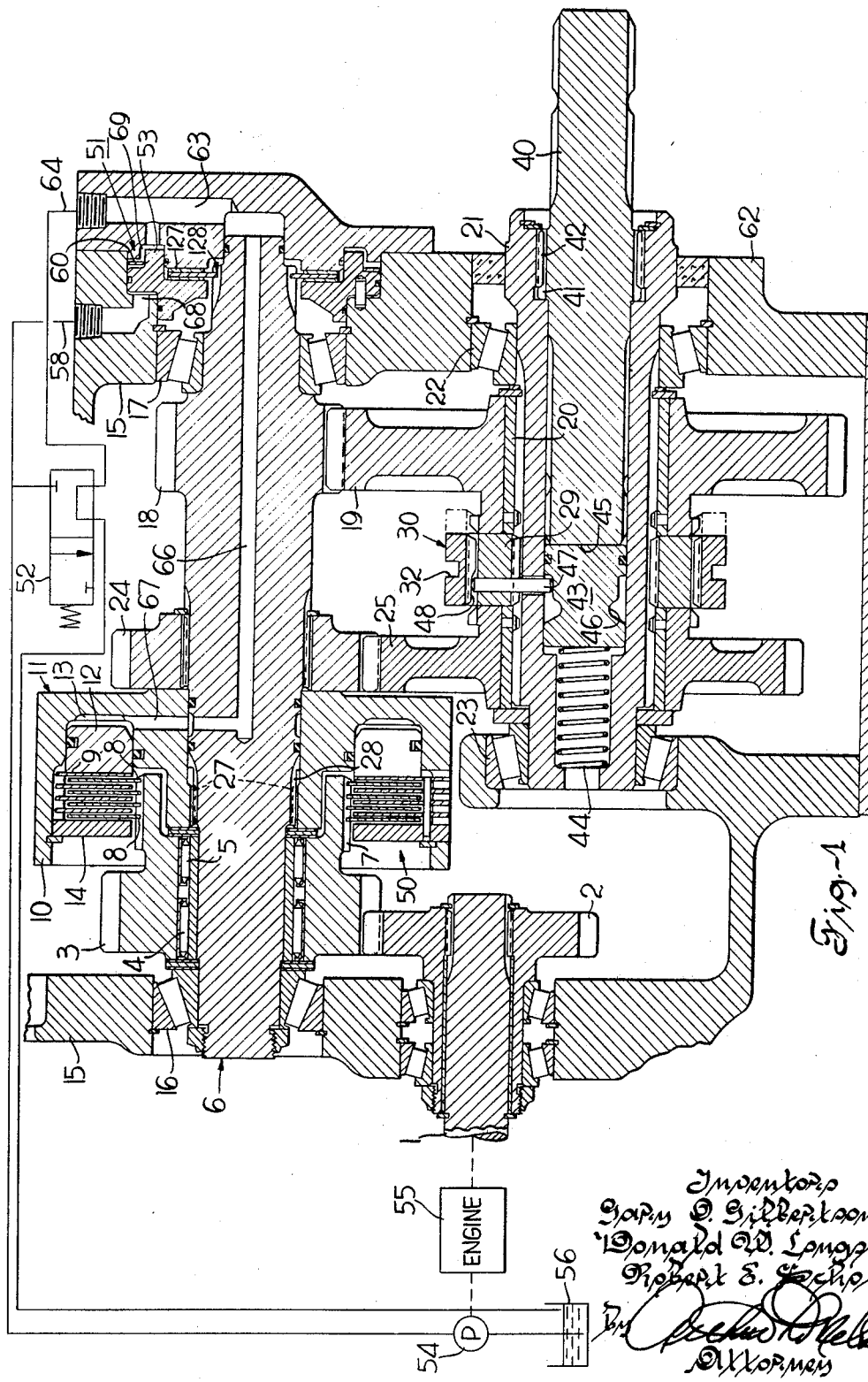

This invention relates to a hydraulic clutch and brake system and more particularly to a system using differential forces applied to a power take-off brake to coordinate the engagement and disengagement of brake with engagement of the clutch for controlling the operation of the power take-off shaft for coupling and decoupling of an implement.

In the conventional vehicle the engine supplies the power and a transmission is provided with a clutch to engage or disengage the drive of the vehicle through the rear wheels. Auxiliary means for engaging and disengaging the power take-off shaft are usually provided. The particular mechanism used is usually a matter of individual design.

Where power delivery through the standard two speed power take-off shaft is used primary and secondary clutches are desirable for selection of speed ratio and coupling of the power take-off shaft to the implement. A freely rotatable power take-off shaft when the tractor engine is not running facilitates coupling of the implement. Application of the brake to the power take-off shaft with engine runnning when the shaft is not in use is an added safety precaution. Likewise, it is desirable to release the brake automatically when power is delivered to the implement.

Accordingly, this invention provides a means whereby a power take-off shaft remains stationary when not in use, and when the primary clutch is engaged there is no drag on the power take-off shaft and maximum efficiency of power transmission is available through the power take-off system. The hydraulic system accomplishes these functions, and also the power take-off shaft has reversible ends carrying either the standard 540 r.p.m. 6-tooth spline, or the 1,000 r.p.m. 21-tooth spline.

It is an object of this invention to provide a clutch and brake, for controlling power transmission from a power source for delivery to the power take-off shaft.

It is another object of this invention to provide a hydraulically actuated brake and clutch whereby the brake automatically disengages when the clutch is engaged for delivering power to the power take-off shaft.

It is a further object of this invention to provide a power take-off brake piston having differential areas on opposing sides of the piston in brake actuating chambers which produce differential forces which coordinate the disengagement of the brake with the engagement of the clutch for transmitting power to the power take-off shaft.

It is a further object of this invention to provide a power take-off brake utilizing mechanical and hydraulic forces on the hydraulic piston to drive the piston in a first direction and a hydraulic force to drive the piston in the opposite direction to thereby coordinate disengagement of the brake with engagement of the clutch to control power transmission to the power take-off shaft.

The objects of this invention are accomplished by providing a hydraulic system including hydraulically actuated clutch and a hydraulically actuated brake between the vehicle transmission and the power take-off shaft. The hydraulic system includes pressurized fluid chambers on opposing sides of the brake piston to normally engage the brake when the clutch is disengaged and automatically disengage the brake when the clutch is engaged when power is transmitted to the power take-off shaft. This is accomplished by differential forces operating on the brake hydraulic piston which may be achieved by the use of differential areas with a constant pressure of fluid operating on opposing sides of the piston or equal areas on opposing sides of the brake piston augmented by a mechanical means such as a spring to disengage the brake when the clutch is actuated. The use of the spring in this system is an added refinement of the invention as it is understood if equal pressure were operating on equal areas on opposing sides of the brake piston that no actuating force would be imposed on the brake piston as the forces would be cancelling each other, the spring assures brake disengagement which may be caused by errors in manufacturing tolerances which may cause a slight drag on the brake when the clutch is engaged.

The preferred embodiments of this invention will be described in the following paragraphs and illustrated in the attached drawings in which:

FIG. 1 illustrates a cross section view of the power take-off assembly with a brake and clutch for controlling power transmission through power take-off assembly;

FIG. 2 illustrates an embodiment of this invention showing differential areas on opposing sides of the brake piston which causes automatic disengagement of the brake when the clutch is actuated; and FIG. 3 illustrates a cross section view of another embodiment of this invention wherein equal areas of facings on opposing sides of the brake piston are illustrated and a spring is used to provide an additional force to disengage the power take-off brake when the power take-off clutch is actuated.

Referring to FIG. 1, a cross section view of a power take-off with a brake and clutch is illustrated. The drive shaft 1 is splined to a pinion 2 and drives the gear 3 which is journaled on the roller bearings 4 and 5 carried on the countershaft 6. The gear 3 has an axial flange 7 which is splined to receive the clutch disks 8 while disks 9 in turn are mounted on the internally splined axial sleeved portion 10 of the hydraulic cylinder 11. The hydraulic piston 12 is axially displaced against the disk stack in response to pressurized fluid within the chamber 13 which presses the disk stack against the pressure plate 14 and frictionally engages the clutch disks. The countershaft 6 is journaled within the housing 15 and the bearing assembly 16 on the left-hand end and the bearing assembly 17 on the right-hand end. A gear 18 is formed integral with the countershaft 6 which drives the gear 19. The gear 19 is supported on a bushing 20 which embraces the sleeve 21 which in turn is rotatably supported by the bearing assemblies 22 and 23 in housing 15. The countershaft 6 is also splined to the gear 24 which drives the spur gear 25 which in turn is supported on the bushing 20 which encircles the sleeve 21.

The clutch cylinder 11 extends radially inward and defines the spline 27 receiving complementary spline 28 on the countershaft 6 for driving the countershaft 6. The opposite end of the countershaft 6 is fastened to rotary brake disk 128 having frictional material 127 which frictionally engages piston 53 and housing 15. The clutch and brake provide a means for engaging and disengaging the countershaft 6 from the drive train through the gears 2 and 3.

A collar 30 is coaxially mounted on a carrier bushing 29 embracing the sleeves 21 and slidable from a neutral position as shown in FIG. 1 to a right-hand position for coupling the gear 19 to the sleeve 21. Also a left-hand position for coupling the gear 25 to the sleeve 21 is permitted when the interlock does not prevent this movement. A suitable fork fits into the annular recess 32 to slide the collar 30 axially to engage gears 19 or 25 with sleeve 21.

The power take-off shaft 40 is inserted in the sleeve 21 with a portion of the shaft 40 extending beyond the housing which is adapted for connection to the power receiving coupling of an implement. The shaft 40 has intermediate spline portion 41 which mates with the internal spline 42 on the sleeves 21. The interlock actuator 43 is spring biased by the spring 44 to engage the facing 45 on the shaft 40. An annular recess 46 receives interlock 47 in the position shown. Movement of the collar 30 to a right-hand position only is permitted. The interlock 47 in its alternate position will drop into a deeper portion of the recess 46 wherein the collar may be manually moved in either the right-hand or left-hand direction to couple the sleeve 21 for 540 r.p.m. speed or 1,000 r.p.m. speed.

The collar 30 is formed with an annular recess 48 on the left-hand end which receives the interlock 47 which permits movement of the collar only in the right-hand direction as shown in FIG. 1. The positioning of the shaft 40 controls the positioning of the interlock 47 which controls the movement of the collar 30. It is noted that the power take-off shaft is shorter on one end than the other and this will account for a movement of the actuator 43 which automatically controls the movement of the collar 30.

FIG. 1 further illustrates schematically a hydraulic system for operating a power take-off clutch 50 and a power take-off brake 51. The system includes a control valve 52 which controls the pressurized fluid to either or both sides of the brake piston 53 and to the clutch piston 12 for engagement of the clutch. The pressurized fluid is received from the pump 54 driven by the engine 55. The low pressure side of the pump 54 is connected to the sump 56.

Referring to FIG. 2 the passage means 57 is in communication with the conduit 58 receiving pressurized fluid for biasing the brake piston 53 to the right-hand position wherein the disk 128 frictionally engages the piston 53 and housing 15. In this position the clutch 50 is disengaged and the countershaft 6 is prevented from rotating which in turn would cause a rotation of a power take-off shaft 40 if either of the gears 25 or 19 were engaged through the collar 30 to the power take-off shaft 40. As a safety precaution this feature prevents the operator from becoming entangled in the end of the power take-off shaft which extends from the housing. The brake piston 53 operates against the biasing force of a wave spring 60 having a serpentine configuration positioned for alternate engagement of the piston 53 and the housing 15 around circumference of chamber 69. A plurality of pins 61 connect the power take-off casing 62 with the piston 53. Power take-off casing 62 in turn is fastened to the brake and clutch housing 15.

FIG. 2 further illustrates passage 63 which is in communication with the conduit 64 of the hydraulic system. The passage 63 is in communication with the chamber 65 and the axial passage 66 extending axially in the countershaft 6. The passage 67 connects pressurizing chamber 13 with the passage 66 which in turn provides actuation of clutch 50 when pressurized fluid is permitted to pass into the pressurizing chamber 13.

The valve 52 controls the flow of pressurized fluid and it can be seen that when the valve prevents the flow of pressurized fluid into a chamber 69 the brake is actuated. When the valves 52 permits the flow of pressurized fluid into the pressurizing chamber 69 then the pressurized fluid acts on both sides of the brake piston 53. Due to the differential areas on opposing sides of the brake piston 53 the brake will be released as a greater hydraulic force is imposed on the right-hand side. The spring 60 is an added refinement to assure disengagement of the brake when this condition exists.

FIG. 3 illustrates a modificaiton of the brake piston 70 as compared to the piston shown in FIG. 2. Pressurizing chamber 71 and pressurizing chamber 72 define equal effective areas upon which the hydraulic fluid imposes opposing forces. When the valve 52 permits the flow of presurized fluid into chamber 71 the brake piston 70 is actuated. When the valve 52 permits the flow of pressurized fluid into the chamber 71 and 72 the hydraulic forces opposing each other are equal. The spring 74, however, augments the force in the left-hand direction to cause the brake piston 70 to move axially and disengage the brake 51. It can be seen that the combination of hydraulic and mechanical forces are used to disengage the brake in contrast to hydraulic fluid alone. In either of the illustrations in FIGS. 2 and 3, the spring may be eliminated, however, it is possible that a limited amount of friction would be caused by not completely disengaging the brake shown in FIG. 3. The brake piston 53 as shown in FIG. 2, however, has a differential of areas upon which the hydraulic fluid will act upon and accordingly the spring 60 might be eliminated in FIG. 2 and the operation would be solely a hydraulic means. It is understood that the principle involved is in the differential forces applied to the brake piston which controls its engagement and disengagement which are in turn correlated to the engagement and disengagement to the power take-off clutch.

The operation of this system will be described in the following paragraphs.

Referring to FIG. 1, the engine 55 drives the pump 54 which provides a substantially constant pressure source of pressurized fluid. When the engine 55 is not running the pump likewise is not running and no pressure is available in the system. With no pressure available in the system the brake 51 is disengaged and the clutch is disengaged and the countershaft 6 is released.

The power take-off assembly as shown provides a collar 30 which can be engaged with either gear 25 or 19 to engage a countershaft 6 to drive the power take-off shaft 40 at either of two speeds. The power take-off assembly as shown permits the collar 30 to be engaged or disengaged thereby providing an added convenience for coupling an implement by the operator.

For convenience in connecting an implement the power take-off shaft should be freely rotatable when the engine is not running. In the type of vehicle which uses the spring actuated brake this feature is not available to the operator.

When the engine 55 is running pressurized fluid is supplied to the valve 52 and chamber 68. The valve 52 has a first position where pressurized fluid can not flow through valves 52 and is supplied only to chamber 68. The valve also has a position whereby fluid flows through valve 52 and may be supplied to chamber 68 and chamber 69. In the valve position whereby pressurized fluid is supplied to chamber 68 alone, the brake is actuated and no pressurized fluid is supplied to chamber 69 or the clutch chamber 13. When the valve is positioned so that pressurized fluid is supplied to the chamber 68 only the brake 51 is engaged and no motion is transmitted through the countershaft to the gears intermediate the countershaft and the power take-off shaft 40. This is a safety feature to prevent a possible entanglement with a moving power take-off shaft 40 when the engine is running.

When the implement is attached, then the valve 52 may be shifted to supply pressurized fluid to the right- and left-hand sides of the brake piston 53 by supplying fluid to chambers 68 and 69. Referring to FIG. 2, the differential areas on opposing sides of the piston will cause the piston 53 to move in the left-hand direction because of the larger area exposed to pressurized fluid and in chamber 69. The larger effective area exposed to pressurized fluid in chamber 69 biases the piston 53 to a left-hand position which in turn disengages the brake 51. Simultaneously with the disengagement of the brake 51, the clutch 50 is engaged. This is accomplished by the pressurized fluid flowing through the passages 63, 66, 67 into the chamber 13. The pressurized fluid in the chamber 13 causes the piston 12 to move in a left-hand direction compressing the disk stack and engaging the clutch disk for transmission of power from the gear 3 to the countershaft 6 which in turn completes the drive chain to the power take-off assembly when the collar 30 engages either gear 19 or 25.

When pressurized fluid is admitted to chamber 71 the brake is engaged because the piston 70 will move to a right-hand position compressing the disk 128 between piston 53 and housing 15. When pressurized fluid is admitted to the chamber 71 and the chamber 72, the hydraulic pressure creates equal forces which cancel each other out and the spring 74 will disengage the brake. The spring 74 will likewise cause a disengagement of the brake when no pressurized fluid is admitted to either of the pressurizing chambers 71 and 72. This condition will exist when the engine is not running.

It is further understood that in some clutches known as wet clutches or brakes, a certain amount of drag is permitted on the frictional engaging disk. This condition could be tolerated in a situation as illustrated in FIG. 3 if no spring were used.

The preferred embodiments of this invention have been illustrated and described and the scope of the invention will be defined by the attached claims.

The embodiments of the invention in which an exclusive property or privilege is claimed are defined as follows:

1. A hydraulic clutch and brake control for a power take-off assembly comprising a driving element and driven element for driving a power take-off shaft, a clutch transmitting power between said driving and said driven elements including a hydraulic fluid actuator defining an expansible fluid chamber for receiving pressurized fluid with a movable wall transmitting fluid thrust for engaging said clutch, a hydraulic brake for braking the driven element, a hydraulic fluid actuator operating said brake including means defining a first expansible fluid chamber for receiving pressurized fluid with a movable wall for transmitting fluid thrust for engaging said brake and a second expansible fluid chamber for receiving pressurized fluid with said movable wall transmitting an opposing fluid thrust at least equal to the engaging fluid thrust for disengaging said brake, means defining a connecting passage continuously communicating with said expansible fluid chamber of said clutch and said second expansible fluid chamber of said brake, a hydraulic system including a source of pressurized fluid, conduit means connected to said source of pressurized fluid in said system and said fluid chambers and continuously supplying pressurized fluid to said first expansible fluid chamber in said brake, valve means in said conduit means selectively and alternatively preventing the flow of pressurized fluid from said source to said second expansible fluid chamber of said brake and said expansible fluid chamber of said clutch for permitting engaging of said brake and disengaging said clutch and directing pressurized fluid to said second expansible fluid chamber of said brake and said expansible fluid chamber of said clutch to release said brake and engage said clutch.

2. A hydraulic clutch and brake control as set forth in claim 1 wherein said actuators in said clutch and said brake include a hydraulic cylinder and a piston defining said expansible chambers for receiving pressurized fluid to engage and disengage said clutch and brake.

3. A hydraulic clutch and brake control as set forth in claim 1 wherein said hydraulic fluid actuators in said brake define differential effective areas transmitting unequal fluid thrusts to said movable wall to engage said brake when said first chamber receives pressurized fluid and to disengage said brake when both of said chambers receive pressurized fluid.

4. A hydraulic clutch and brake control as set forth in claim 1 wherein a spring is included in the second of said expansible chambers to augment the force of pressurized fluid in said second chamber when pressurized fluid is present in both of said chambers to thereby release said brake when said clutch is actuated.

5. A hydraulic clutch and brake control as set forth in claim 1 wherein said driven element drives the power take-off shaft and includes a two-speed secondary clutching means for selectively and alternatively driving said power take-off at a low speed and a high speed.

6. A hydraulic clutch and brake control as set forth in claim 1 wherein said driven element drives the power take-off shaft and includes a secondary clutching means having a neutral position permitting disengagement of the driven element from said power take-off shaft to further facilitate coupling of an implement to the power take-off shaft.

7. A hydraulic clutch and brake control as set forth in claim 1 including engine means for driving said source of pressurized fluid and said brake is released when said engine means is not operating thereby permitting said driven element to rotate freely.

8. A hydraulic clutch and brake control as set forth in claim 1 including a spring in the second of said chambers releasing said brake when no pressurized fluid is in either of said expansible chambers of said brake thereby permitting said driven element to rotate freely.

References Cited

UNITED STATES PATENTS

| 1,864,126 | 6/1932 | Ferris | 192—17.1 |
| 2,193,068 | 3/1940 | Keck | 192—18.1 |
| 3,209,872 | 10/1965 | Moyer et al. | 192—18.1 XR |
| 3,424,285 | 1/1969 | McRay | 192—18.1 |

BENJAMIN W. WYCHE III, Primary Examiner

U.S. Cl. X.R.

74—15.4, 411.5; 188—151; 192—4, 15, 114